(12) United States Patent
Sterle

(10) Patent No.: US 6,669,422 B1
(45) Date of Patent: Dec. 30, 2003

(54) DEVICE FOR ASSEMBLING TWO PARTS HAVING A POSITIONING SET

(75) Inventor: Christophe Sterle, Rochester Hills, MI (US)

(73) Assignees: Valeo, Paris (FR); Visteon Systemes Interieurs, La Defense Cedex (FR)

( * ) Notice: Subject to any disclaimer, the term of this patent is extended or adjusted under 35 U.S.C. 154(b) by 0 days.

(21) Appl. No.: 10/019,478
(22) PCT Filed: Jun. 30, 2000
(86) PCT No.: PCT/FR00/01847
§ 371 (c)(1),
(2), (4) Date: Jun. 12, 2002
(87) PCT Pub. No.: WO01/02739
PCT Pub. Date: Jan. 11, 2001

(30) Foreign Application Priority Data

Jul. 1, 1999 (FR) .............................. 99 08735

(51) Int. Cl.[7] ............................ F16B 35/02; F16B 37/12
(52) U.S. Cl. ..................... 411/384; 411/178; 411/535; 411/546
(58) Field of Search ................................. 411/178, 383, 411/384, 535, 536, 546

(56) References Cited

U.S. PATENT DOCUMENTS

| 4,043,239 A | 8/1977 | DeFusco |
| 4,108,407 A | * 8/1978 | Cable et al. ............ 411/384 X |

FOREIGN PATENT DOCUMENTS

| DE | 42 28 625 C1 | 3/1994 |
| EP | 0 768 468 A1 | 4/1997 |

* cited by examiner

*Primary Examiner*—Neill Wilson
(74) *Attorney, Agent, or Firm*—Young & Thompson

(57) ABSTRACT

A device for assembling two components (1,2) includes a lateral positioning set (3). The device includes a fixing screw (10), in particular threaded on the right, and capable of moving freely in a smooth through hole (13) provided in the first component (1), a spacer (20) bearing an external thread (23), in particular on the left, capable of co-operating with a tapped through hole (23), in particular on the left, provided on the second component (2) and an internal tapping (21), in particular on the right capable of co-operating with the fixing screw (10), the screw (10)/spacer (20) friction coefficient, directly or indirectly, being greater than the spacer (20)/tapped hole (23) friction coefficient, directly or indirectly.

11 Claims, 3 Drawing Sheets

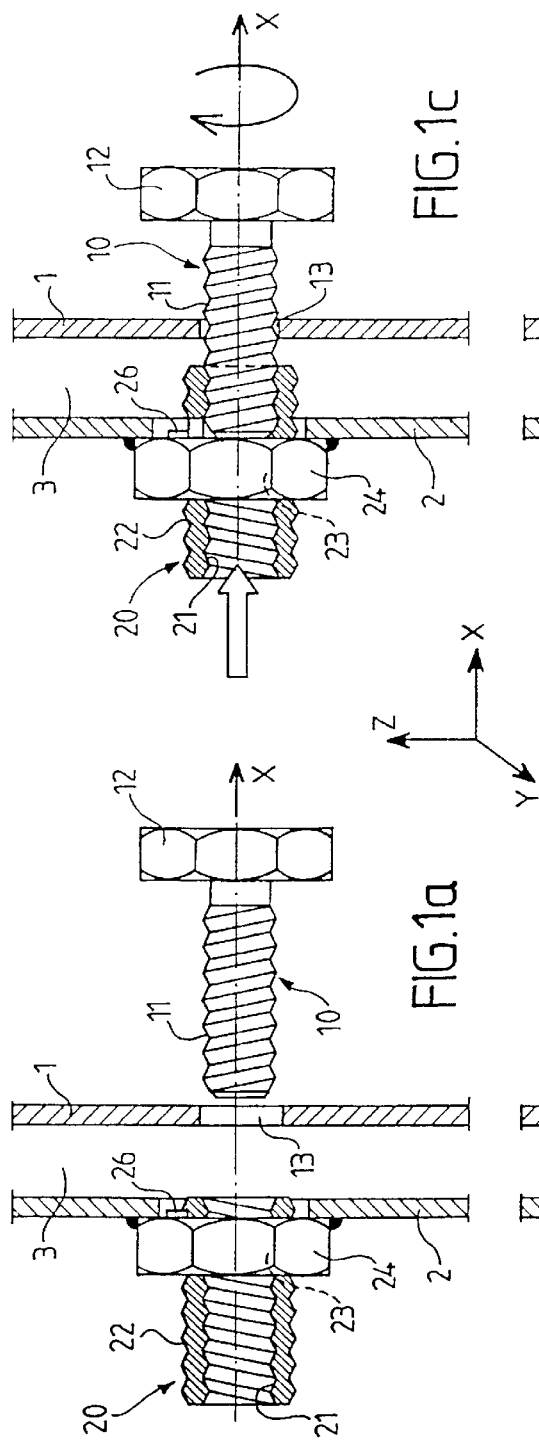
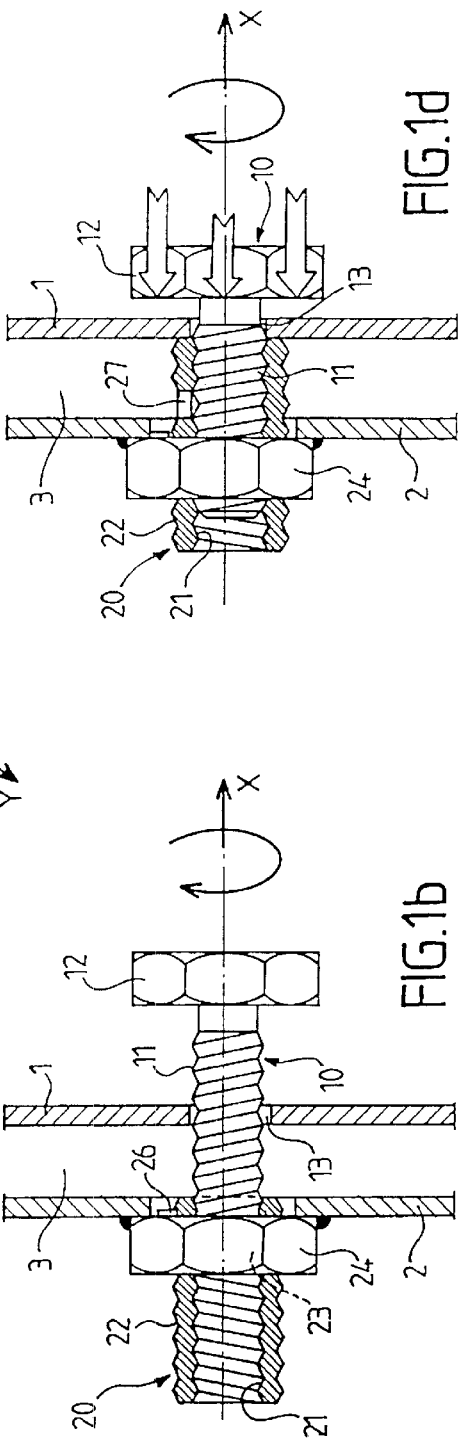

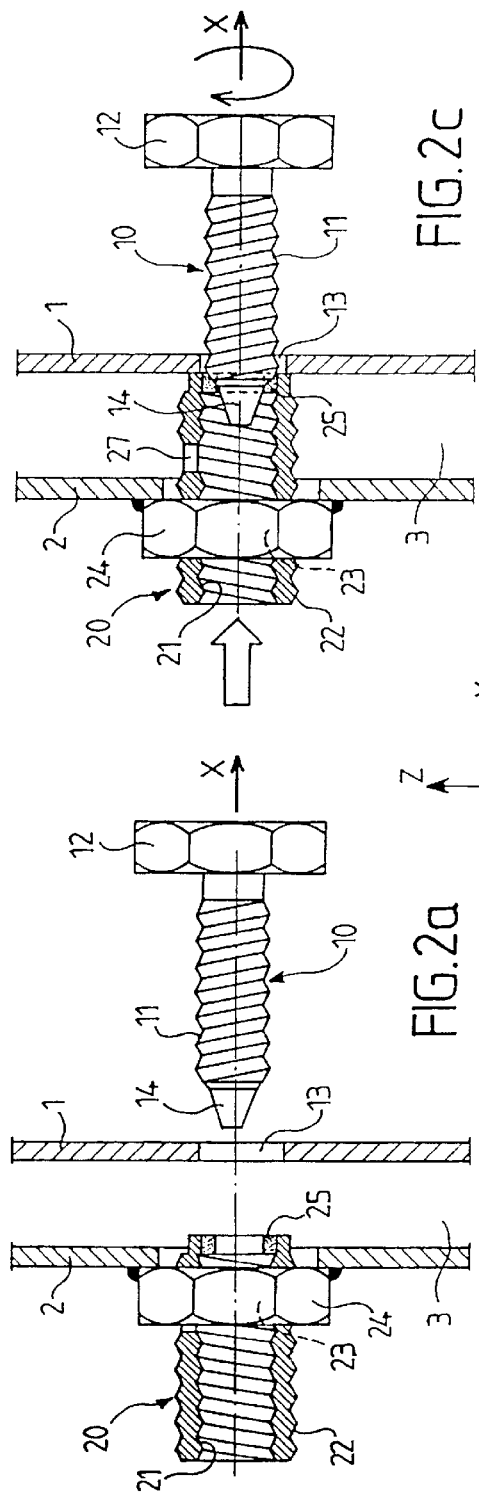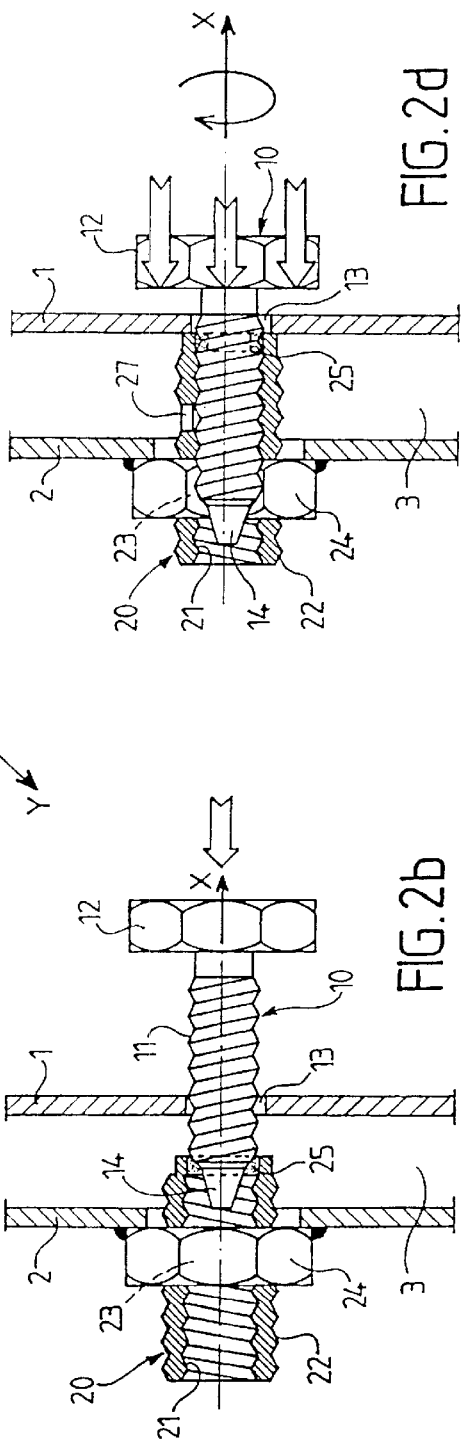

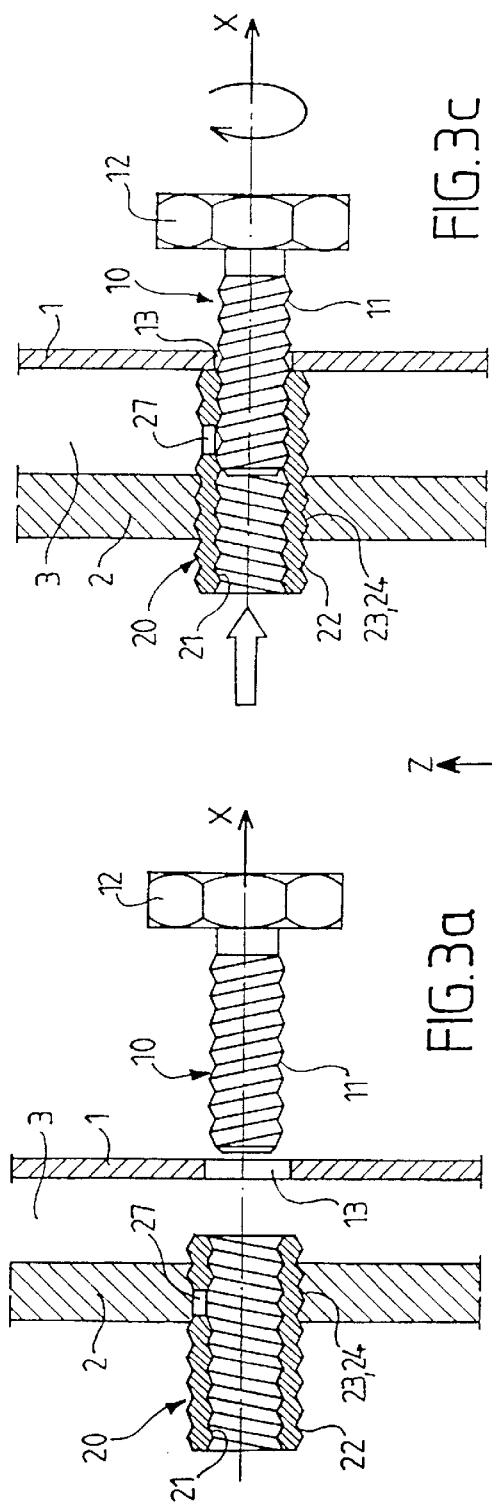
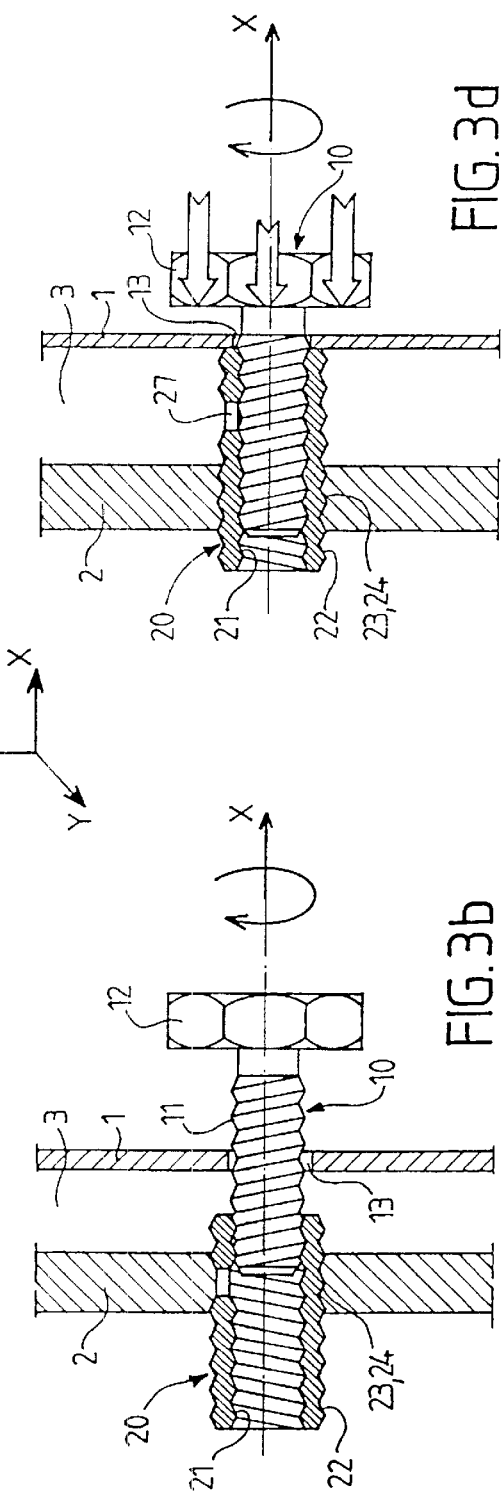

DEVICE FOR ASSEMBLING TWO PARTS HAVING A POSITIONING SET

FIELD OF THE INVENTION

The present invention relates to a device for assembling two parts exhibiting lateral positional play in a given direction.

BACKGROUND OF THE INVENTION

The invention will find a particularly advantageous application especially, but not exclusively, in the field of motor-vehicle construction.

In industry in general, it is often necessary, by means of fixing screws, to have to assemble parts which exhibit positional play between them. This play may be lateral play in a direction X, in the sense that the parts are not contiguous, and are separated by a certain gap in the X direction. The positional play may also be transverse, in the YZ plane perpendicular to X, which is manifested by the fact that the parts are not exactly opposite one another, the fixing holes for the parts to be assembled no longer being in coincidence.

This type of situation is encountered in particular in motor-vehicle construction, when it is a question of assembling the internal front crosspiece which carries a certain number of accessories (the dashboard, air-conditioner, airbag, etc), to the pillars lying on either side of the passenger compartment of the vehicle. With the tolerances in this field being wide, the said crosspiece most often exhibits relatively substantial positional play with each of the pillars.

In order to remedy this drawback, it is possible to take up the transverse positional play in the YZ plane by using fixing holes which are not circular but oblong. As far as the lateral positional play in X is concerned, there exist means for compensating for the gap between the two parts, such as the insertion of washers, or of an adjustable spacer consisting of five different elements as is described in the U.S. Pat. No. 4,682,906, for example.

However, none of these known means is really satisfactory, since they are awkward to put into practice, in the case of the system with washers, or very complex, in the case of the adjustable spacer.

SUMMARY OF THE INVENTION

Hence, the technical problem to be resolved by the object of the present invention is to propose a device for assembling the two parts featuring lateral positional play in a given direction, which is simple both in its use as well as in its composition.

The solution to the technical problem posed consists, according to the present invention, in that the device includes, all aligned in the said given direction:

a smooth through-hole formed in a first part, a fixing screw able to be moved freely through the said smooth through-hole and carrying a threading of a first type, a tapped through-hole of a second type, formed directly or indirectly on the second part opposite the smooth through-hole, a spacer carrying, on the one hand, an external threading of the said second type, able to interact with the said tapped through-hole, and, on the other hand, an internal tapping of the said first type, able to interact with the said fixing screw, the coefficient of friction provided, directly or indirectly, between the fixing screw and the spacer being different from the coefficient of friction provided, directly or indirectly, between the spacer and the tapped through-hole.

The characteristics of the friction coefficient are, for example, related to the angle of the thread of the threadings/tappings and/or to the properties of the materials present, especially of those of the friction members possibly provided between the said fixing screw, the said spacer and/or the said tapped through-hole.

In what follows, "type" of threading or of tapping will be understood to be either "right-hand" or "left-hand". For example, if the said first type of threading of the fixing screw and of internal tapping of the spacer is designed to be right-hand, then the second type of tapping of the tapped through-hole and of external threading of the spacer will be designed to be left-hand.

Thus, as will be seen in detail later, the assembly device in accordance with the invention functions in the following manner, for a coefficient of friction between the fixing screw and the spacer higher than the coefficient of friction between the spacer and the tapped through-hole.

The fixing screw is first of all engaged in the spacer, fixed to the second part, through the smooth through-hole of the first part. It is then actuated and penetrates into the spacer until the friction between the fixing screw and the spacer becomes sufficiently high for the drive movement applied to the screw to cause the rotation of the spacer in the tapped through-hole, the fixing screw and the spacer remaining fixed with respect to one another.

Because of the tapping and of the inverse threading, the screw/spacer assembly then moves in a translational movement inverse to the direction of insertion of the screw into the spacer. In the course of this movement, the spacer becomes engaged in the gap between the two parts to be assembled, until it comes into abutment against the first part. At that moment, the fixing screw can again penetrate into the spacer, until it comes to bear against the first part. The two parts are then completely and positively assembled.

It will be noted that employing the assembly device of the invention is very simple, since the only action which it requires is the rotational movement of the fixing screw. Moreover, only two elements are necessary to produce it, namely a tapping applied to the second part, and a spacer interacting with the said tapping and the fixing screw.

BRIEF DESCRIPTION OF THE DRAWINGS

The description which will follow, in connection with the attached drawings, given by way of non-limiting examples, will give a good understanding of what the invention consists of and how it can be implemented.

FIG. 1a is an overall side view of a first implementation of the assembly device in accordance with the invention.

FIG. 1b is a side view of the assembly device of FIG. 1a in a first phase of employment.

FIG. 1c is a side view of the assembly device of FIG. 1a in a second phase of employment.

FIG. 1d is a side view of the assembly device of FIG. 1a in a final phase of employment.

FIGS. 2a, 2b, 2c and 2d are views equivalent to FIGS. 1a to 1d, for a second embodiment of the assembly device in accordance with the invention.

FIGS. 3a, 3b, 3c and 3d are views equivalent to FIGS. 1a to 1d, for a third embodiment of the assembly device in accordance with the invention.

DESCRIPTION OF THE PREFERRED EMBODIMENTS

In FIG. 1 are represented, in side view, a device for assembling two parts, for example a pillar 1 of the passenger compartment of a vehicle and a front interior crosspiece 2. The two parts 1 and 2 to be assembled exhibit at least one lateral positional play between them in the X direction, characterised by a gap 3 between the pillar 1 and the crosspiece 2.

The assembly device of FIG. 1 includes a fixing screw 10 carrying a threading 11, right-hand for example, and able to be moved freely through a smooth through-hole 13, formed in the pillar 1. Furthermore, the said fixing screw 10 comprises a head 12 the diameter of which is greater than the diameter of the smooth through-hole 13, this so as to allow the head 12 to come to bear against the pillar 1 at the end of the assembly.

Moreover, the assembly device of the invention also includes a spacer 20 carrying a right-hand internal threading 21, able to interact with the fixing screw 10, and a left-hand external threading 22 able to interact with a left-hand-tapped through-hole 23 formed on the crosspiece 2, facing the smooth through-hole 13.

In the embodiment example of FIG. 1, what is involved is a hole formed indirectly. More precisely, the said tapped through-hole consists of the internal tapping 23 of a nut 24 welded to the crosspiece 2, but it could also have been formed directly in the thickness of the crosspiece 2.

Finally, the fixing screw 10, the spacer 20 and the nut 24 are in a direct relationship with one another and are designed in such a way that the coefficient of friction provided, directly or indirectly, between the fixing screw 10 and the spacer 20 is different from the coefficient of friction provided, directly or indirectly, between the spacer 20 and the nut 24, for example greater.

In FIG. 1a the presence will be noted of an external plastic tab 26 between the nut 24 and the spacer 20, which is intended to promote the securing of the nut 24 and of the spacer 20 at rest, but to break beyond a certain value of torque force applied to the spacer 20.

This tab device is not part of the system, and its use will depend on the dimensional characteristics of the threadings and tappings used.

The functioning of the assembly device of FIG. 1a is then as follows.

As FIG. 1b shows, the fixing screw 10 is first of all engaged in the spacer 20 through the smooth hole 13. With the spacer 20 being held fixed, especially by the plastic tab 26, the screw 10 can penetrate into the spacer 20 until the screwing torque transmitted to the tab 26, by way of the screw 10/spacer 20 friction, is sufficiently high to break the tab 26.

At that moment, and as the spacer 20/nut 24 friction is less than the screw 10/spacer 20 friction, the movement of screwing of the fixing screw 10 causes the rotation of the spacer 20 in the nut 24, which, because of the left-hand threading, induces a backwards movement of the screw 10/spacer 20 assembly within the gap 3, until the spacer 20 comes into abutment against the pillar 1, as can be seen in FIG. 1c.

With the spacer 20 being blocked, the fixing screw 10 can then continue its travel into the said spacer, and complete the operation of assembling the two parts 1 and 2, by causing the screw head 12 to bear against the pillar 1, as indicated in FIG. 1d.

In FIG. 1d can also be seen a radial blocking hole 27 pierced into the spacer 20, allowing for a tool to be inserted for the purpose of blocking the spacer 20 in rotation when it is desired, for example, to unscrew the fixing screw 10 in order to dismantle the pillar 1/crosspiece 2 assembly.

The embodiment represented in FIGS. 2a to 2d differs from that described previously with regard to FIGS. 1a to 1d in that the link between the spacer 20 and the fixing screw 10 is indirect. More precisely, the spacer 20 is equipped with an internal friction ring 25 acting as a restraining means able to increase the coefficient of friction between the fixing screw 10 and the spacer 20. Advantageously, the said fixing screw 10 is then provided with a conical pilot end 14. In this case, the plastic tab 26 can be omitted.

The link between the tapped through-hole 23 and the spacer 20 can itself also be indirect, especially by reason of the use of a friction element between these two parts, which would modify their friction coefficient.

As regards the embodiment of FIG. 3, it should be noted that the threading of the nut 24 of the preceding embodiments is achieved directly by a tapping of a sufficient thickness of the crosspiece 2, such that the nut 24 disappears and that only its threading 23 remains functionally in place.

That being so, it should be noted that the spacer 20 of this embodiment can also be equipped, if needs be, with an external tab or with an internal ring as described with regard to FIG. 1 or 2.

Furthermore, the embodiments described have been said to have a right-hand-threaded screw. Nevertheless, the inverse situation can, naturally, be envisaged and, in this case, the screw 10 and the internal tapping 21 would be of the "left-hand" type, while the nut 24 and the external threading would be of the "left-hand" type.

Other embodiments, within the scope of the person skilled in the art, could naturally have been envisaged without to any extent departing from the context of the invention.

What is claimed is:

1. A device for assembling first and second parts exhibiting lateral positional play in a given direction, the device comprising the following that are all aligned in the given direction:
    a smooth through-hole in the first part;
    a fixing screw freely movable through said smooth through-hole and carrying a threading of a first type;
    a tapped through-hole of a second type on the second part opposite said smooth through-hole; and
    a spacer carrying an external threading of the second type able to interact with said tapped through-hole and an internal tapping of the first type able to interact with said fixing screw, a coefficient of friction between said fixing screw and said spacer being different from a coefficient of friction between said spacer and said tapped through-hole,
    said tapped through-hole and said spacer being linked by a frangible plastic tab.

2. The device according to claim 1, wherein said tapped through-hole is formed in the second part.

3. The device according to claim 1, wherein said tapped through-hole is carried by a nut attached to the second part.

4. The device according to claim 1, wherein said spacer includes a restraint that increases the coefficient of friction between said fixing screw and said spacer.

5. The device according to claim 4, wherein said restraint is a friction ring concentric with said spacer.

6. The device according to claim 1, wherein said spacer includes a radial hole for blocking in rotation.

7. The device according to claim 1, wherein the first type of threading is right-handed and the second type is left-handed.

8. The device according to claim 1, wherein the first type of threading is left-handed and the second type is right-handed.

9. A device for assembling first and second parts exhibiting lateral positional play in a given direction, the device comprising the following that are all aligned in the given direction:
- a smooth through-hole in the first part;
- a fixing screw freely movable through said smooth through-hole and carrying a threading of a first type;
- a tapped through-hole of a second type on the second part opposite said smooth through-hole; and
- a spacer carrying an external threading of the second type able to interact with said tapped through-hole and an internal tapping of the first type able to interact with said fixing screw, a coefficient of friction between said fixing screw and said spacer being different from a coefficient of friction between said spacer and said tapped through-hole,
- wherein said spacer includes a restraint that increases the coefficient of friction between said fixing screw and said spacer, and
- wherein said restraint is a friction ring concentric with said spacer.

10. The device according to claim 9, wherein said spacer includes a radial hole for blocking in rotation.

11. A device for assembling first and second parts exhibiting lateral positional play in a given direction, the device comprises the following that are all aligned in the given direction:
- a smooth through-hole in the first part;
- a fixing screw freely movable through said smooth through-hole and carrying a threading of a first type;
- a tapped through-hole of a second type on the second part opposite said smooth through-hole; and
- a spacer carrying an external threading of the second type able to interact with said tapped through-hole, and an internal tapping of the first type able to interact with said fixing screw, a coefficient of friction between said fixing screw and said spacer being different from a coefficient of friction between said spacer and said tapped through-hole,
- wherein said spacer includes a radial hole for blocking in rotation.

* * * * *